W. BEERS.
Axles for Vehicles.
No. 151,346.
Patented May 26, 1874.
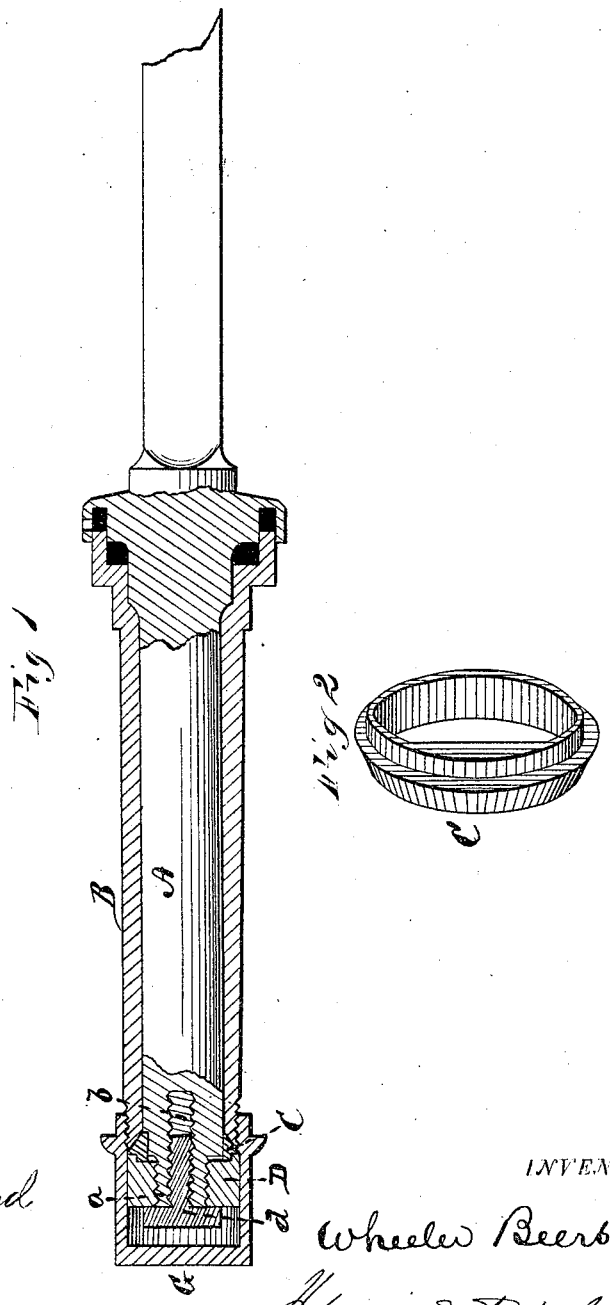
WITNESSES.
Franck L. Durand
C. L. Evert
INVENTOR
Wheeler Beers
Alexander Diator
By
Attorneys.

UNITED STATES PATENT OFFICE.

WHEELER BEERS, OF BRIDGEPORT, CONN., ASSIGNOR OF ONE-HALF HIS RIGHT TO THE ÆTNA SPRING AND AXLE COMPANY, OF SAME PLACE.

IMPROVEMENT IN AXLES FOR VEHICLES.

Specification forming part of Letters Patent No. 151,346, dated May 26, 1874; application filed April 16, 1874.

*To all whom it may concern:*

Be it known that I, WHEELER BEERS, of Bridgeport, in the county of Fairfield and in the State of Connecticut, have invented certain new and useful Improvements in Axles for Vehicles; and do hereby declare that the following is a full, clear, and exact description thereof, reference being had to the accompanying drawings, and to the letters of reference marked thereon, making a part of this specification.

The nature of my invention consists in the construction and arrangement of devices for fastening wheels on axles, as will be hereinafter more fully set forth.

In order to enable others skilled in the art to which my invention appertains to make and use the same, I will now proceed to describe its construction and operation, referring to the annexed drawing, in which—

Figure 1 is a longitudinal section of a spindle and axle-box with the device for holding the box on the spindle, and Fig. 2 is a perspective view of a washer used in said fastening device.

A represents the ordinary spindle of an axle, and B the skein or axle-box placed on the same. The outer end of the box is turned flaring on the inner side, and a washer, C, is placed on the spindle, the inner end of said washer being slightly conical to fit said turned end of the box. One side of the spindle is made straight or square, and the interior of the washer C shaped to correspond, so as to prevent its turning on the spindle. D represents the ordinary open nut screwed upon the rib $a$ of the spindle, and bearing against the outer surface of the washer C, to hold the same in and against the box B. The box, therefore, does not revolve on the flange of the nut, but on the stationary washer. In the end of the rib $a$ of the spindle is made a threaded hole or recess, $b$, to receive a jam-screw, $d$, the head of which bears against the outer end of the nut D. It is very common for the thread on the rib or on the nut to strip by the strain of a load on a side hill or in a rut. The jam-screw $d$ prevents the nut D from turning and from stripping under such strain. It also packs the nut against the washer to prevent lateral motion in the box. If the thread of the nut D be left-handed, the thread in the recess $b$ should be right-handed, and vice versa, so that the nut and jam-screw must be unscrewed in opposite directions. Upon the end of the box B is screwed an oil-cup nut, G, which covers and incloses the nut and jam-screw, as shown, and may be made to answer as a receptacle for oil or other lubricants, and suitable provision made to permit the lubricant to reach the spindle A. The jam-screw $d$ also serves to follow up the wear of the washer, for, as the washer wears, it is forced farther in and tightened by the nut C, after which the jam-screw is screwed up or farther in to hold the nut.

Having thus fully described my invention, what I claim as new, and desire to secure by Letters Patent, is—

1. The combination, with the spindle A, provided with a screw-recess in its end, of the washer C, nut D, and the jam-screw $d$, all substantially as and for the purposes set forth.

2. The combination of the spindle A, box B, washer C, nut D, jam-screw $d$, and oil-cup nut G, all constructed substantially as and for the purposes set forth.

In testimony that I claim the foregoing I have hereunto set my hand this 18th day of March, 1874.

WHEELER BEERS.

Witnesses:
  O. P. LEWIS,
  WM. C. DISBROW.